May 15, 1962 J. B. McCONNELL ET AL 3,034,507
INTRACUTANEOUS INJECTION DEVICE
Filed May 10, 1960 2 Sheets-Sheet 2

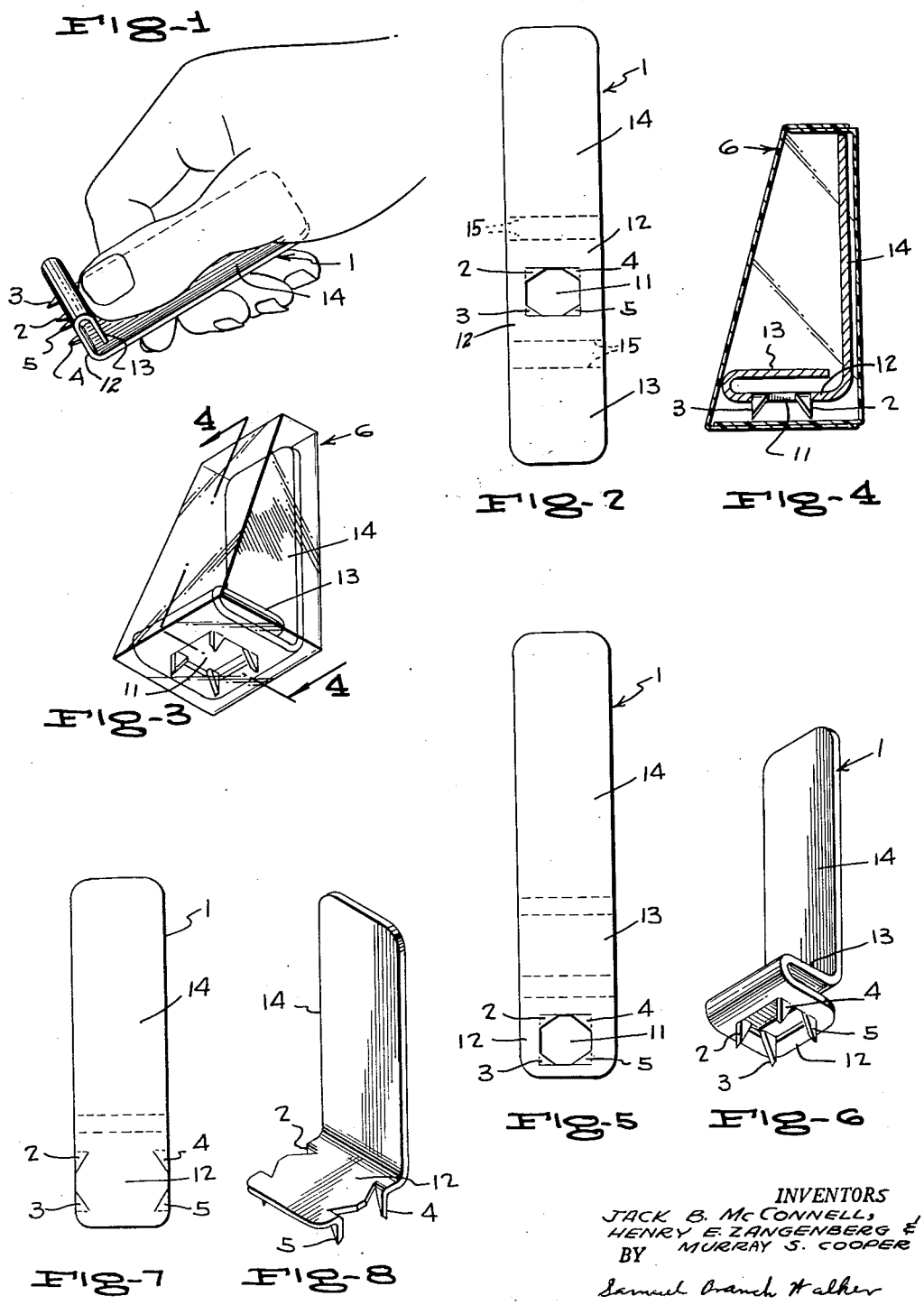

INVENTORS
JACK B. McCONNELL,
HENRY E. ZANGENBERG &
BY MURRAY S. COOPER

Samuel Branch Walker
ATTORNEY

United States Patent Office 3,034,507
Patented May 15, 1962

3,034,507
INTRACUTANEOUS INJECTION DEVICE
Jack B. McConnell, New City, N.Y., and Henry E. Zangenberg, Westwood, and Murray S. Cooper, Dumont, N.J., assignors to American Cyanamid Company, New York, N.Y., a corporation of Maine
Filed May 10, 1960, Ser. No. 28,110
5 Claims. (Cl. 128—253)

This invention relates to an intracutaneous injector suitable for use as a means of administering intracutaneous injections, and also to a self-contained unit consisting of a sealed container, preferably disposable, which encloses a device having sharp prongs which are coated with dried or semi-dried biologically-active material for administering a multiple-puncture, intracutaneous injection, designed to be used only once.

Intracutaneous injections have been and currently are being used in the practice of medicine for a variety of diagnostic, prophylactic and therapeutic purposes. Fluids, greases, ointments, powders, crystals and the like; containing or composed of allergens, which are materials capable of eliciting an allergic reaction, as well as vaccinia-virus type products which are materials capable of eliciting a vesiculopustular lesion and, in addition, toxins, antitoxins, toxoids, sera and the like, are placed in abraded or scratched skin areas, driven into the skin by means of skin-puncturing devices, or, in those instances where the materials are in a fluid state, injected intracutaneously by means of a syringe and needle set-up to accomplish a diagnostic reaction or a prophylactic or therapeutic treatment.

Present techniques for administering intracutaneous injections have disadvantages; particularly in cases where the quick, accurate, and inexpensive treatment of large groups such as military forces, native populations, victims in a disaster area and the like, is a desirable or necessary object, and especially where it is imperative to use unskilled or semi-skilled assistants. In particular, those present intracutaneous injection techniques which provide the most accurate and reproducible means for diagnosis, prophylaxis and therapy, present certain difficulties. For instance, placement of a biologically-active material upon the intact skin, followed by the use of a multiple-puncture device having a vertical stabbing action to carry the material through the skin surface and thus administer an intracutaneous injection involves problems of contamination of the material or the device; which can cause infection. Moreover, when a multiple-puncture device includes energized moving parts, the device is likely to be expensive and present mechanical difficulties, and psychological resistance to its use is frequently encountered in native populations and children. If the device is to be used more than once, it must be sterilized before each use.

Numerous intracutaneous injections presently are administered by means of a hypodermic syringe and separate needle. Syringes and needles are expensive and require a high degree of skill and experience to insure that the dose is injected intradermally. They may cause contamination of material in containers during repeated fillings, and even with some conventional sterilization procedures may transmit blood-borne diseases such as homologous serum hepatitis from person to person. They have a tendency to leak and break, are readily contaminated, and may cause the occurrence of false tests if not thoroughly cleaned. Furthermore, a syringe plus needle set-up limits the types of materials used to those which are fluid. Thus, this method is not particularly applicable to the treatment of large groups or the utilization of semi-skilled assistants.

Our invention provides a multiple-puncture type, intracutaneous injection appliance which is disposable, inexpensive, unbreakable, and sterilizable; and which is capable of practically painless, accurate and reproducible operation by unskilled or semi-skilled personnel; and is capable of being fabricated from a wide variety of materials and over a wide range of sizes and shapes, and capable of being stored in a preferred dosage for long periods of time.

In a preferred embodiment, the invention consists of a disposable, sealed container which encloses a continuous, shaped strip of noncorrosive metal; which strip includes at one end a substantially flat rectangular section fabricated in such manner that four sharp prongs are formed, which prongs are coated with a dried or semi-dried biologically-active material capable of eliciting an allergic reaction or of producing a vacciniform local infection. It is an advantage of the invention that the prongs, being of predetermined length, penetrate only a specific distance into the skin of the subject. Thus, a wound of proper depth is inflicted by the intracutaneous injection appliance even in the hands of unskilled personnel. Another advantage of the invention lies in the provision of a handle on the intracutaneous injection appliance whereby the hand of the operator can neither contaminate the punctured area nor be contaminated by the biologically-active material being used. The operator may become sensitized to the biologically-active material being used, and be deleteriously affected by getting it on his hands. The present handle and shape are such that a desired dose is administered as desired, with a minimum chance of accidental contact. A separate thumb pressure plate isolates the user from accidental contact in the preferred embodiments.

The invention will now be described in greater detail by reference to the drawings, wherein:

FIGURE 1 shows a perspective view of a preferred embodiment of the intracutaneous injector as held in the hand during use, the embodiment being one in which the handle and the thumb pressure plate are on opposite sides of the injector plate.

FIGURE 2 shows a plan view of the metal strip from which the embodiment of FIGURE 1 is formed.

FIGURE 3 is a perspective view of the embodiment of FIGURE 1 in a disposable sealed container.

FIGURE 4 is a transverse vertical section taken on the line 4—4 of FIGURE 3.

FIGURE 5 is a plan view of an embodiment of the intracutaneous injector in which the flat thumb pressure plate is between the injector plate and the handle.

FIGURE 6 is a perspective view of the embodiment shown in FIGURE 5 after the strip is bent to shape.

FIGURE 7 shows a top plan view of the metal strip of an embodiment in which the flat injector plate also serves as the thumb pressure plate and the prongs are externally formed.

FIGURE 8 is a perspective view of the embodiment of FIGURE 7 bent to finished shape.

Figure 9:
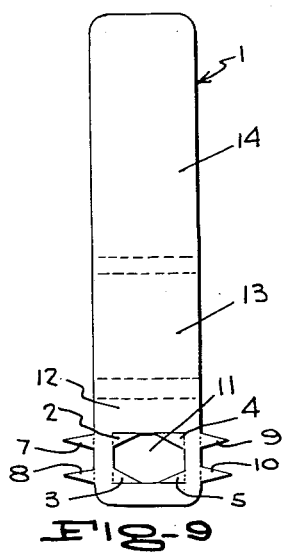
FIGURE 9 is a plan view of an embodiment having double prongs and in which the thumb plate is between the injector plate and the handle.
Figure 10:
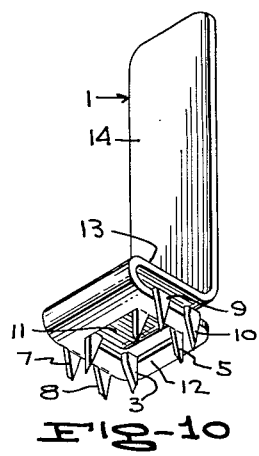
FIGURE 10 shows the embodiment of FIGURE 9 bent to finished shape.

The metal strip 1 from which the intracutaneous injector is formed is preferably of a noncorrosive metal, such as stainless steel or nickel-steel, or aluminum, which is from about 0.006-inch to 0.010-inch thick. Thinner strips bend more easily than is desirable. Thicker strips require more metal and leave larger wounds, but give perfectly satisfactory intracutaneous injections. The strips of stainless metal are preferably about ⅜-inch wide and have a handle from ¼- to 3-inches long. The section from which the injector plate 12 and the thumb pressure plate 13 are formed is about square. The exact proportions are not critical. A width of ⅜-inch is large enough for effective use and small enough to be economical both as to size, first cost, and shipping and storage.

The strip from which the injector is formed is cut conveniently in a single operation to have rounded corners and an octagonal piece 11 is cut out to form an internal aperture. Four prongs 2, 3, 4 and 5 are conveniently cut in a separate die cutting operation to surround the octagonal cut out piece. These prongs are then bent at an angle of approximately 90° with the injector plate 12. The cutting out and bending of the prongs is preferably accomplished in a single operation, although separate operations may be used. The flat strip is then bent so that the thumb pressure plate 13 is bent around behind and parallel to the injector plate now having prongs. The handle on the other side is bent behind the points of the injector plate and at an angle to the injector plate. Conveniently, this angle is also 90°, but angles other than 90° may be used, such as, about 60° as shown in FIGURE 13.

The length of the prongs should be such that the points lie in a plane substantially parallel to the under surface of the injector plate 12 and so that the prongs have a length of from about 1 to 10 millimeters. A length of 2 to 4 millimeters is usually preferred. The bend lines are indicated in FIGURE 2. A gradual bend is preferred so that the thumb pressure plate is an appreciable distance, conveniently ¹⁄₁₆- to ¼-inch, behind the injector plate 12. As shown in FIGURE 4, the completed intracutaneous injector is conveniently packaged in a plastic container 6. The choice of material may be appropriate for the specific biologically-active material used. In general, it is convenient to have a container which is permeable to ethylene oxide so that the assembled device can be sterilized in final form. With killed biologically-active materials, such as old tuberculin, a film such as a polyethylene film may be used. With live virus preparations, such as smallpox vaccine, the final assembly operations must be accomplished sterilely and sterilization after assembly is not practical. Depending upon such choices of biologically-active materials, other films such as vinyl resins, rubber hydrochloride, polyvinylidene chloride, and polymers of ethylene gylcol and terephthalic acid may be used. Paper, which is impermeable to moisture, or which has been treated so as to be impermeable to moisture, or metal foil, or laminates of two or more such films are convenient.

Figure 11:
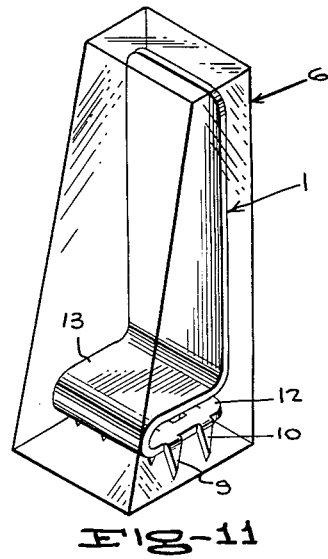
FIGURE 11 shows a perspective view of the embodiment of FIGURES 9 and 10 in a disposable sealed container.

The dried or semi-dried biologically-active material with which the injection prongs are coated may be any such material suitable for use, in such state, for intracutaneous injection. An example would be the mass determination of the prevalence of tuberculosis in a community, using old tuberculin. This material may be prepared by evaporating, to the desired concentration, the cell-free filtrate from a culture of tubercle bacilli. The prongs of the sterilized intracutaneous injection device are dipped into this fluid and dried; thereby insuring that each prong is coated with the material. It should be noted that the drying of a viscous material on prongs placed in positions other than vertical may result in the retraction of that material away from the point during the drying process. It should also be noted that potency is assured for a considerable period of time because of the stability of this OT in a semi-dried state under varying conditions of temperature and humidity.

In addition to the preferred embodiments of this invention as heretofore described, other variations may be used to advantage when faced with individual problems concerning the handling of old tuberculin (OT), purified protein derivative (PPD), smallpox vaccine and the like. For instance, when smallpox vaccine is to be used, the injection device of choice might be one equipped with twin sets of injection prongs on four corners, 2 and 7, 3 and 8, 4 and 9, 5 and 10 as shown in FIGURES 9 and 10, where material is also stored in the interstices between adjacent prongs as well as on the prongs. In smallpox vaccination, a sufficient dose is a necessity. Obviously, the ability to store smallpox vaccine in the interstices between adjacent prongs insures the presence of a sufficient amount of material for a definite test. A lack of a sufficiency of material has heretofore been one of the criticisms directed against the employment of this technique. In the assembling of a smallpox vaccine unit, special techniques are also a necessity. This biologically-active material is a live virus upon which ethylene oxide has a viricidal effect. Thus, with this particular vaccine, the entire procedure of coating the multiple-injection prongs with the vaccine and packaging the vaccine-coated injection device is done aseptically. Moreover, since a vacuum is desirable to maintain the viability of the smallpox virus, the container should preferably be of glass or metal and the unit vacuum-sealed. Other biologically-active materials present other packaging problems; which can be used with this invention by those familiar with the art.

Various ways of assembling the self-contained, disposable, multiple-puncture intracutaneous injection unit may be employed. A method, in the case of an OT unit, is to die-cut and form multiple injection prongs from a strip of noncorrosive metal, bend the strip to the desired shape, clean and heat-sterilize the device thus formed, load the prongs with old tuberculin or other agent, drip-dry, insert the prepared injection device into the container, sterilize with ethylene oxide through the container, and package in boxes for shipment.

In employing this multiple-puncture, intracutaneous injection unit, the package is opened in such a manner as to avoid contamination of the biologic-coated injection prongs. The handle of the device is grasped between the thumb and a finger of the right or left hand of the operator and placed against the skin of the subject in such a way that the injection prongs are perpendicular to the skin surface. Pressure is then applied to the pressure application plate by means of the operator's finger and controlled by means of the thumb and finger pressure on the handle. This applied pressure is used to drive the prongs, coated with biologically-active material, through the outer skin surface and thus administer an intracutaneous injection.

In FIGURES 5 and 6, an embodiment is shown which is, in general, similar to the embodiment in FIGURES 1 to 4 except that instead of having continuous coil bend, as shown in FIGURES 1 to 4, a reverse coil bend is used so that injector plate 12 is on one side of the thumb pressure plate 13 and the handle 14 is on the other side of the thumb pressure plate.

A separate configuration is shown in FIGURES 7 and 8 in which the four prongs 2, 3, 4 and 5 are bent from the injector plate 12 to which is attached the handle 14. In this configuration, there is no separate thumb pressure plate, and the prongs 2, 3, 4 and 5 are bent from the outside edges of the injector plate 12 by cutting out and bending down the triangular prongs.

FIGURES 9 through 11 show a configuration in which internal prongs 2, 3, 4 and 5 are bent from the periphery of an octagonal cut out as in the modification shown in FIGURES 5 and 6. Additionally, however, four outside prongs 7, 8, 9 and 10 are formed, which extend outwardly from that portion of the strip which is to become the injector plate and are bent down at the same time that the internal prongs 2, 3, 4 and 5 are bent so as to give a total of eight prongs. Again, it is preferred that the length of all prongs should be such that the points lie in a plane substantially parallel to the under surface of the injector plate 12 and have a length of from 1 to 10 millimeters, preferably from about 2 to 4 millimeters. In the configuration shown, the thumb pressure plate is between the injector plate and the handle. This modification is also packed in a plastic container 6 as shown in FIGURE 11.

Figure 12:
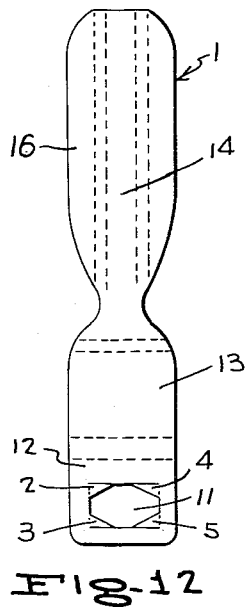
FIGURE 12 is a plan view of the metal strip from which an embodiment is formed with a side flanged handle, and which handle is at an angle less than 90° with the thumb pressure plate.
Figure 13:
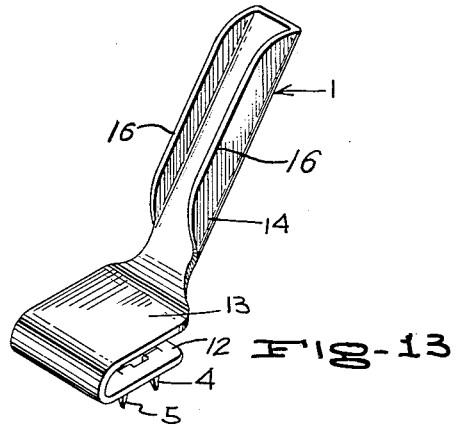
FIGURE 13 shows the embodiment of FIGURE 12 bent to finished shape.

FIGURES 12 and 13 show a configuration, in general, similar to that shown in FIGURES 5 and 6, except that the handle is broader and has flanges 16 which are bent up on each side so as to give a handle of U shaped configuration. The flanges give additional rigidity to the handle.

The above modifications are illustrative of the present invention. Alternately, it is possible to fabricate injection plates 12, pressure-application plates 13, and handles 14, either continuously from a strip or as discrete entities. These sections may be made in a variety of forms such as circular, ovoidal, triangular, rectangular, square and the like, and from a variety of materials such as noncorrosive metals, thermosetting resins with or without fillers, glass, ceramic materials, cellulosic materials, and the like, and combinations of these materials. In many cases, the injection prongs may be of noncorrosive metal inserted into nonmetallic injection plates in appropriate patterns. If fabricated as discrete sections, the injection plates, pressure-application plates, and handles may be joined together, at appropriate angles, by means of bolts, screws, solder, glue, and the like to form complete devices which may be of various sizes. Other variations are, of course, possible.

This invention may be usefully employed in individual or mass investigations for tuberculin sensitivity (OT, PPD, etc.), Bacille Calmette-Guerin (BCG) vaccination, smallpox vaccination and many other purposes wherein intracutaneous injection of a dried or semi-dried biologically-active material is both desirable and technically possible. The preferred embodiment of this invention, as described, can be manufactured at low cost and is eminently suitable for mass investigations and the treatment of large sectors of the world's populations.

Without being limited to exact embodiments shown in the drawings, our invention is set forth in the claims below.

We claim:

1. An intracutaneous injector comprising: a shaped continuous strip of a noncorrosive metal having a flat injector plate carrying a plurality of injection prongs from 1 to 10 millimeters in length on one side only of said injector plate and perpendicular thereto, said prongs coated with a dried biologically-active material, and having a flat thumb pressure plate parallel to and spaced from said flat injector plate, and having a handle section at an angle of about 60° or greater to said flat injector plate, and which is suitable for use as a handle for the appliance.

2. An intracutaneous injector cut out and bent from a single continuous strip of noncorrosive metal comprising: a flat injector plate, a plurality of injector prongs integral with, cut from the same metal section as, and bent at 90° to said injector plate, a flat thumb pressure plate substantially parallel to said flat injector plate, and a handle at an angle to said plates.

3. An intracutaneous injector cut out and bent from a single continuous strip of noncorrosive metal comprising: a flat injector plate, a plurality of injector prongs integral with, cut from the same metal section as, and bent at 90° to, said injector plate, and having a length of from 1 to 10 millimeters, a flat thumb pressure plate, substantially parallel to and behind said flat injector plate, a handle at an angle of about 90° to said plates, a biologically-active material on said prongs, and a plastic container permeable to ethylene oxide in which said intracutaneous injector is enclosed, said injector being sterile, other than for the desired biological activity.

4. The intracutaneous injector assembly of claim 3 in which the handle and the thumb pressure plate are on opposite ends of the injector plate.

5. The intracutaneous injector assembly of claim 3 in which the thumb pressure plate is between the injector plate and the handle, so that the injector plate is integral with, and on a fold line at 180° to the plane of the said pressure plate, and the handle is at an angle of 90° with, integral, and on a fold line on the opposite side of the said pressure plate.

References Cited in the file of this patent

UNITED STATES PATENTS

| | | |
|---|---|---|
| 585,007 | Rambaud | June 22, 1897 |
| 2,619,962 | Rosenthal | Dec. 2, 1953 |
| 2,706,482 | Griffitts | Apr. 19, 1955 |
| 2,801,633 | Ehrlich | Aug. 6, 1957 |
| 2,893,392 | Wagner et al. | July 7, 1959 |

UNITED STATES PATENT OFFICE
CERTIFICATE OF CORRECTION

Patent No. 3,034,507 May 15, 1962

Jack B. McConnell et al.

It is hereby certified that error appears in the above numbered patent requiring correction and that the said Letters Patent should read as corrected below.

Column 6, line 20, for "cut from" read -- cut out from --.

Signed and sealed this 28th day of August 1962.

(SEAL)
Attest:

ESTON G. JOHNSON
Attesting Officer

DAVID L. LADD
Commissioner of Patents